(12) United States Patent
Ebisawa et al.

(10) Patent No.: US 11,333,535 B2
(45) Date of Patent: May 17, 2022

(54) METHOD FOR CORRECTING VALUES DETECTED BY LINEAR SCALES

(71) Applicant: OMRON Corporation, Kyoto (JP)

(72) Inventors: Keita Ebisawa, Moriyama (JP); Shingo Hayashi, Otsu (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/297,613

(22) PCT Filed: Dec. 13, 2019

(86) PCT No.: PCT/JP2019/048984
§ 371 (c)(1),
(2) Date: May 27, 2021

(87) PCT Pub. No.: WO2020/129850
PCT Pub. Date: Jun. 25, 2020

(65) Prior Publication Data
US 2022/0003580 A1   Jan. 6, 2022

(30) Foreign Application Priority Data

Dec. 21, 2018   (JP) .............................. JP2018-240358

(51) Int. Cl.
*G01D 18/00*   (2006.01)
*G01B 11/00*   (2006.01)
*G01D 5/04*   (2006.01)

(52) U.S. Cl.
CPC .......... *G01D 18/00* (2013.01); *G01B 11/005* (2013.01); *G01D 5/04* (2013.01)

(58) Field of Classification Search
CPC ...................................................... G01D 18/00
See application file for complete search history.

(56) References Cited

U.S. PATENT DOCUMENTS

2003/0095186 A1* 5/2003 Aman .................... G06T 7/292
348/169
2009/0263199 A1* 10/2009 Wang .................... B23Q 15/22
408/124
2017/0295303 A1* 10/2017 Costa .................. H04N 5/2257

FOREIGN PATENT DOCUMENTS

JP   S62119607 U   7/1987
JP   H116711 A   1/1999
(Continued)

OTHER PUBLICATIONS

International Search Report issued in Intl. Appln. No. PCT/JP2019/048984 dated Feb. 4, 2020. English translation provided.
(Continued)

*Primary Examiner* — Phuong Huynh
(74) *Attorney, Agent, or Firm* — Rossi, Kimms & McDowell LLP

(57) ABSTRACT

Provided is a method for more accurately correcting position coordinates of a point on an object to be imaged, the coordinates being identified based on values detected by linear scales. A visual field is moved to a measurement point defined on a recessed portion formed on a calibration plate, and an image is captured (step S13-1), edges are detected from an image of sides of the recessed portion (step 313-2), an intersection of the edges is calculated (step S13-3), values of the intersection as actually measured by the linear scales are saved (step S13-4), and position coordinates of the point on the object to be imaged as detected by the linear scales are corrected by using a true value and a difference.

4 Claims, 13 Drawing Sheets

(56) References Cited

FOREIGN PATENT DOCUMENTS

| | | | |
|---|---|---|---|
| JP | 2003233424 | A | 8/2003 |
| JP | 2009204306 | A | 9/2009 |
| JP | 2016038493 | A | 3/2016 |

OTHER PUBLICATIONS

Written Opinion issued in Intl. Appln. No. PCT/JP2019/048984 dated Feb. 4, 2020. English translation provided.

* cited by examiner

Fig. 12

| | A | | B | | C | | D | | E | |
|---|---|---|---|---|---|---|---|---|---|---|
| | X axis | Y axis | X axis | Y axis | X axis | Y axis | X axis | Y axis | X axis | Y axis |
| 001 | -999999 | -999999 | -999999 | -999999 | -999999 | -999999 | -999999 | -999999 | -999999 | -999999 |
| 002 | -999999 | -999999 | -999999 | -999999 | -999999 | -999999 | -999999 | -999999 | -999999 | -999999 |
| 003 | -999999 | -999999 | -999999 | -999999 | -999999 | -999999 | -999999 | -999999 | -999999 | -999999 |
| 004 | -999999 | -999999 | -999999 | -999999 | -999999 | -999999 | -999999 | -999999 | -999999 | -999999 |
| 005 | -999999 | -999999 | -999999 | -999999 | -999999 | -999999 | -999999 | -999999 | -999999 | -999999 |

Correction table creation

Start measurement

Camera in motion

Measurement result    Error table

Check log

Undo

Save result    Load substrate    Unload substrate    Maintenance menu

METHOD FOR CORRECTING VALUES DETECTED BY LINEAR SCALES

TECHNICAL FIELD

The present invention relates to a method for correcting values detected by linear scales.

BACKGROUND ART

A dimension measuring apparatus in the related art has been proposed, the dimension measuring apparatus including an X-Y table that moves in X, Y directions, a linear scale that measures the amount of movement in each direction, a sighting device that performs positioning, a calibration plate including a plurality of markers whose positions are exactly known, and an arithmetic unit (see Patent Document 1).

In such an apparatus, the calibration plate is placed on the X-Y table, positions of the plurality of markers are measured by two linear scales, and the plurality of measured values and the plurality of accurate values indicating the positions of the markers are stored in the arithmetic unit. Then, when measurement is performed on a measurement target, the measurement is corrected by the arithmetic unit based on the stored values.

PRIOR ART DOCUMENTS

Patent Documents

Patent Document 1: Japanese Utility Model Publication No. S62-119607

SUMMARY OF THE INVENTION

Problems to be Solved by the Invention

The calibration plate used in the above-described dimension measuring apparatus is an aluminum plate or the like from which strain is eliminated and that has holes with a small radius made in a grid pattern.

In such a calibration plate, since the radius of each hole serving as a marker is small, an influence of an error when extracting a center of a reference circle from a point on a circumference of the hole on an image tends to be large.

The present invention has been made in view of the above-described problems, and it is therefore an object of the present invention to provide a method for more accurately correcting position coordinates of a point on an object to be imaged, the coordinates being identified based on values detected by linear scales.

Means for Solving the Problem

Provided according to the present invention for solving the above-described problems is a method for correcting values detected by linear scales of an apparatus, the apparatus being configured to identify position coordinates of a point on an object to be imaged based on the values detected by the linear scales, the method including:

using a calibration plate having recessed portions or projecting portions arranged two-dimensionally, the recessed portions or the projecting portions each having sides intersecting each other, holding, as a true value, position coordinates of an intersection of the sides in a substrate coordinate system defined for the calibration plate, acquiring, as an actually measured value, position coordinates, in the substrate coordinate system, of a reference point defined as an intersection of edges detected from an image of the sides, intersecting each other, of the recessed portions or the projecting portions within a captured image of the calibration plate, the position coordinates being detected by the linear scales, and correcting values of the point, detected by the linear scales, on the object to be imaged using a difference between the actually measured value and the true value as a correction amount.

This allows the reference point to be defined as the intersection of the edges detected from the image of the sides of the recessed portions arranged on the calibration plate. Since straight lines passing through two points on the edges of the sides, intersecting each other, of the calibration plate are calculated, the two points being separate from each other to some extent, and the reference point is defined as the intersection of the straight lines thus calculated, an effect of an error can be reduced. Therefore, as described above, when values of a point on the object to be imaged detected by the linear scales are corrected by using the calibration plate, position coordinates of the point on the object to be imaged can be corrected more accurately.

Further, according to the present invention, when there is a difference in temperature of the calibration plate between when the true value is acquired and when the actually measured value is acquired, the true value may be corrected by an amount of change caused by thermal expansion based on the difference in temperature.

This allows, when there is a difference in temperature from when the true value is acquired during the calibration using the calibration plate, correction to be made with thermal expansion of the calibration plate due to the difference in temperature taken into account.

Further, according to the present invention, when there is misalignment of the apparatus between when the true value is acquired and when the actually measured value is acquired, the true value may be corrected by an amount of the misalignment.

This allows, even when the calibration plate is misaligned due to rotation or translation relative to the apparatus during actual measurement acquisition using the calibration plate, correction to be made with this misalignment taken into account.

Further, according to the present invention, the calibration plate may be made of a square plate and have the recessed portions arranged two-dimensionally, each of the recessed portions being formed by spotfacing into a square shape on a surface of the square plate and having the sides.

The use of the calibration plate formed as described above makes an edge clearer and more distinct when an image of sides of a recessed portion is captured, thereby allowing more accurate correction.

Effect of the Invention

According to the present invention, it is possible to provide a method for more accurately correcting coordinates of a position of a point on an object to be imaged, the coordinates being identified based on a value detected by a linear scale.

BRIEF DESCRIPTION OF THE DRAWINGS

FIG. 12 is a display example of a user interface on which errors of the measurement point are displayed according to the embodiment.

MODE FOR CARRYING OUT THE INVENTION

First Embodiment

Hereinafter, a visual inspection apparatus 1 according to an embodiment of the present invention will be described in more detail with reference to the drawings.

Figure 1:
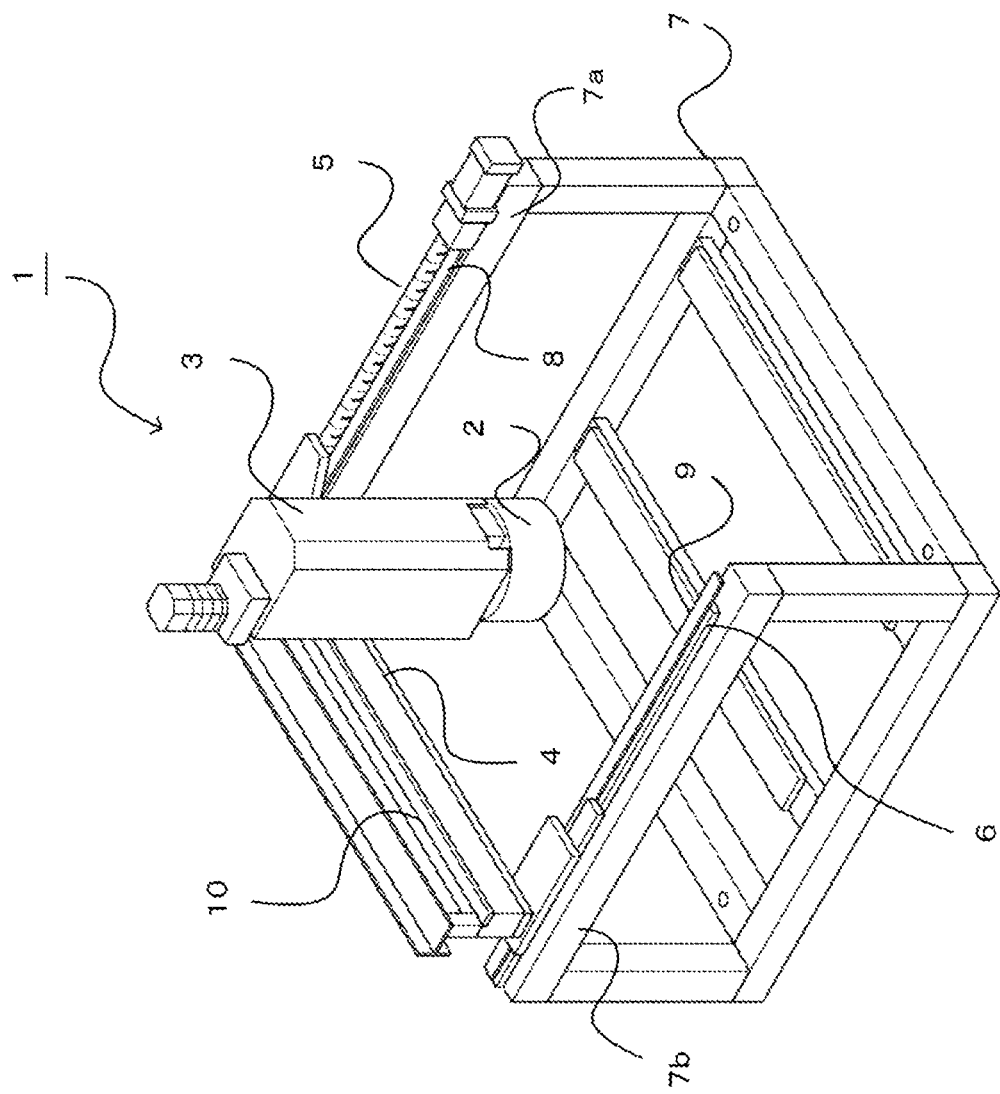
FIG. 1 is a perspective view of a visual inspection apparatus according to an embodiment, schematically showing a structure of the visual inspection apparatus.

FIG. 1 is a perspective view of the visual inspection apparatus 1, schematically showing a structure of a primary part of the visual inspection apparatus 1. The visual inspection apparatus 1 primarily includes a gantry 4 that supports an imaging unit 3 movable in an X-axis direction, the imaging unit 3 including a camera 2 that captures an image of an inspection target object, a ball screw 5 that drives the gantry 4 in a Y-axis direction, a guide 6 that guides the gantry 4 driven by the ball screw 5 in the Y-axis direction, and a frame 7 that supports the components. A ball screw support 7a of the frame 7 extending in the Y-axis direction is provided with a linear scale 8 in parallel with the ball screw 5, the linear scale 8 being configured to detect the position of the gantry 4. Similarly, a guide support 7b of the frame 7 extending in the Y-axis direction is provided with a linear scale 9 in parallel with a rail that guides a slider provided on the gantry 4, the linear scale 9 being configured to detect the position of the gantry 4. Further, a linear scale 10 that detects the position of the imaging unit 3 is provided on the gantry 4 extending in the X-axis direction.

The linear scales 8, 9, 10 each include a member to be detected disposed on the frame 7 and the gantry 4 and a detector provided on the gantry 4 and the imaging unit 3, and the detector detects position information on the member to be detected.

In the visual inspection apparatus 1 shown in FIG. 1, the imaging unit 3 is provided with the camera 2 having a visual field facing downward. Disposed below the camera 2 is a conveyor that transfers an inspection target object in the X-axis direction. The inspection target object loaded by the conveyor from the outside of the visual inspection apparatus 1 stops below the camera 2 and is clamped at a predetermined position. Upon completion of inspection, the inspection target object is transferred by the conveyor from below the camera 2 to the outside of the visual inspection apparatus 1.

With a substrate 11 taken as an example of the inspection target object, a method for obtaining a coordinate value of a point P on the inspection target object will be described.

Figure 2A:
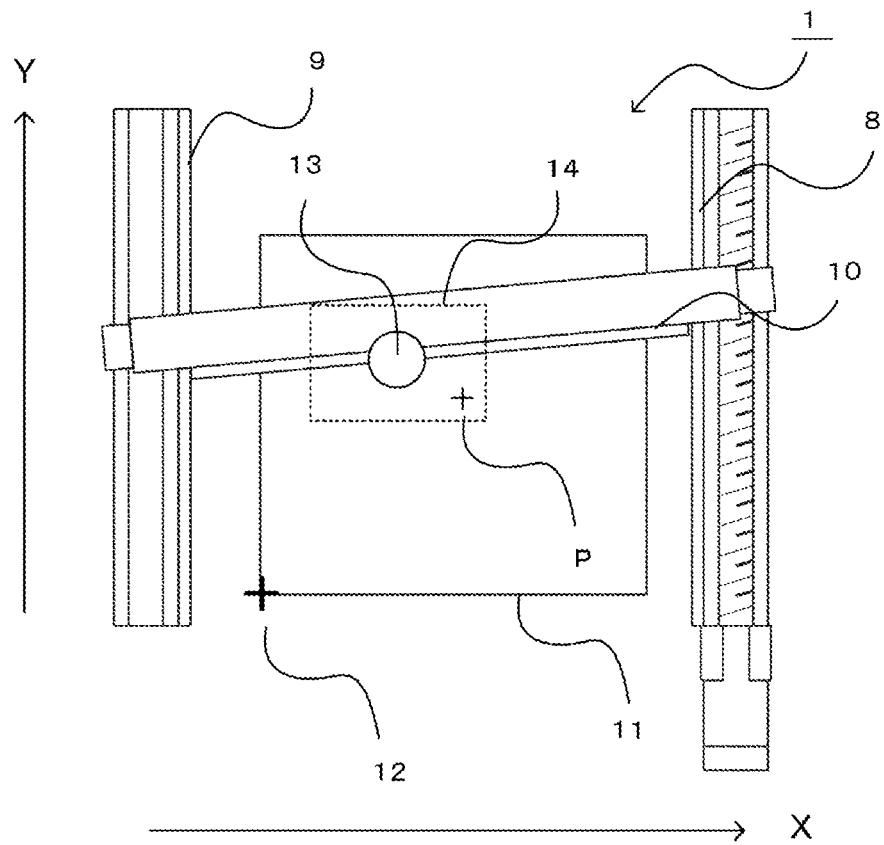
FIG. 2(A) is a plan view schematically showing the visual inspection apparatus according to the embodiment.
Figure 2B:
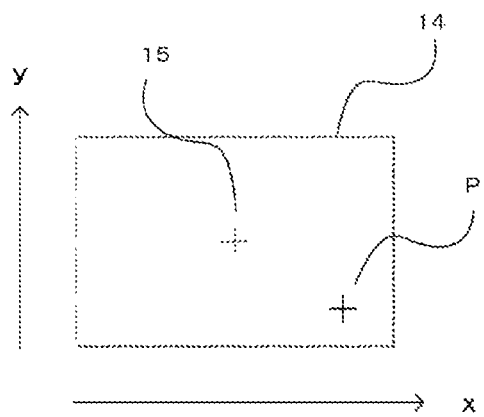
FIG. 2(B) is an enlarged view of one visual field.

FIG. 2(A) is a diagram schematically showing a state where the substrate 11 placed at a predetermined position is viewed from vertically above the visual inspection apparatus 1. The ball screw 5, the linear scale 8, the guide 6, and the linear scale 9 are arranged in parallel with the Y-axis direction. Further, the gantry 4 that supports the imaging unit 3 is located extending in a direction intersecting the Y-axis direction. In FIG. 2(A), a point 12 is a substrate coordinate system origin defined for the substrate 11. Further, a point 13 is an image capture system axis position, herein corresponding to a position of an optical axis of the camera 2. A region 14 surrounded by a dashed line in FIG. 2(A) is a visual field of the camera 2, and this visual field 14 contains the point P on the substrate 11. FIG. 2(B) is an enlarged view of one visual field 14 surrounded by the dashed line in FIG. 2(A). Herein, a point 15 is a visual field coordinate system origin, and a visual field center is set as (0,0). The visual field coordinate system origin 15 coincides with the image capture system axis position 13.

According to the embodiment, the position of the point P on the substrate 11 in the substrate coordinate system with the substrate coordinate system origin set as (0,0) is calculated as P=image capture system axis position+detected coordinate in visual field.

A description will be given of how to calculate the image capture system axis position 15 for linear scale correction with reference to FIG. 3. A solid arrow indicates the substrate coordinate system, and a dashed arrow indicates a machine coordinate system. Herein, a point 16 is a machine coordinate system origin. A reference numeral 17 denotes a motor.

Figure 3:
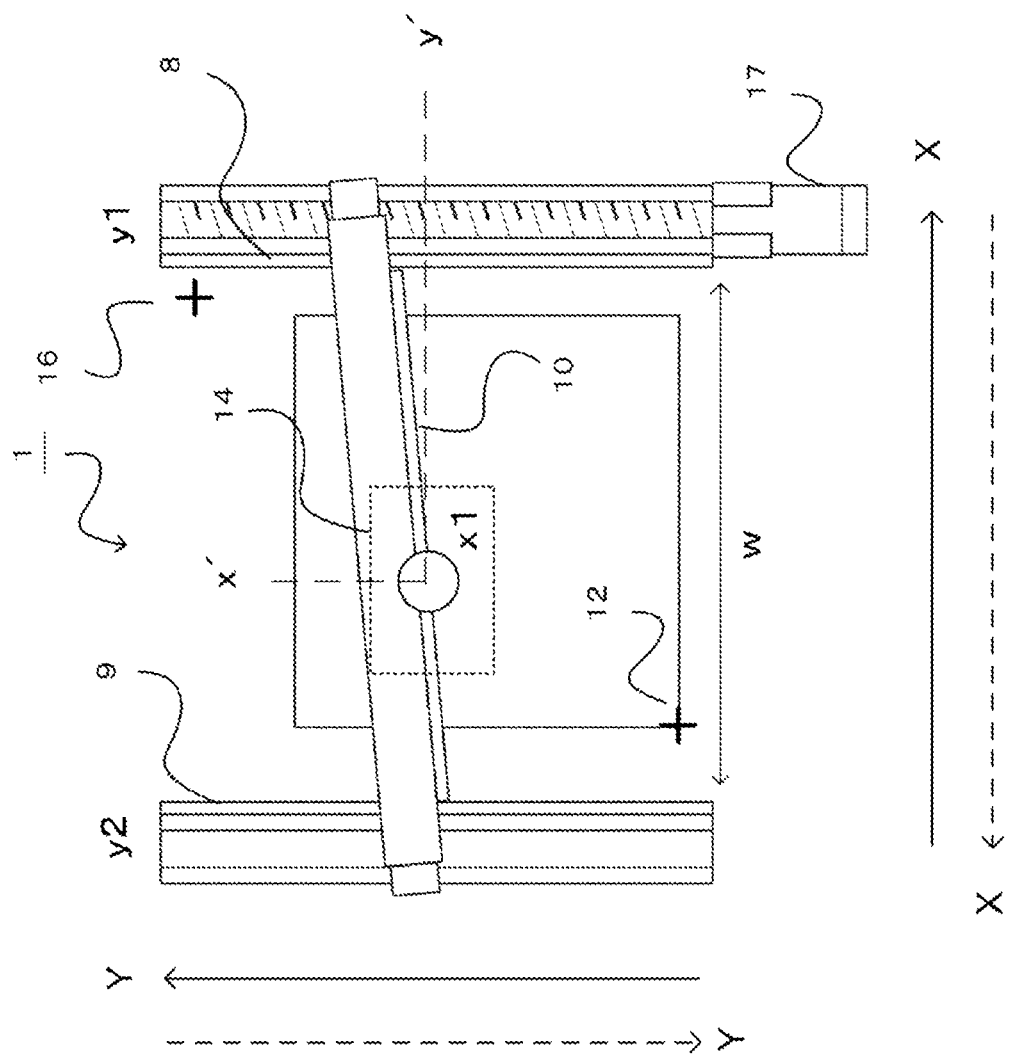
FIG. 3 is a diagram for describing how to calculate an image-capture position according to the embodiment.

In FIG. 3, y1 (μm) and y2 (μm) denote a measured value of the linear scale 8 and a measured value of the linear scale 9, respectively. x1 (μm) denotes a measured value of the linear scale 10. w (μm) denotes a distance between the linear scales 8, 9. Herein, the measured values of the linear scales 8, 9, 10 have the substrate coordinate system origin set as (0,0) in the substrate coordinate system (or alternatively, may have the machine coordinate system origin set as (0,0)). At this time, the image capture system axis position (x' (μm), y' (μm)) is calculated by the following Equation (1):

$$y' = y2 - (y2 - y1)*(x1/w)$$

$$x' = x1$$

where x' approximates x1 because x' is nearly equal to x1 when y2−y1 is smaller than w.

Figure 4:
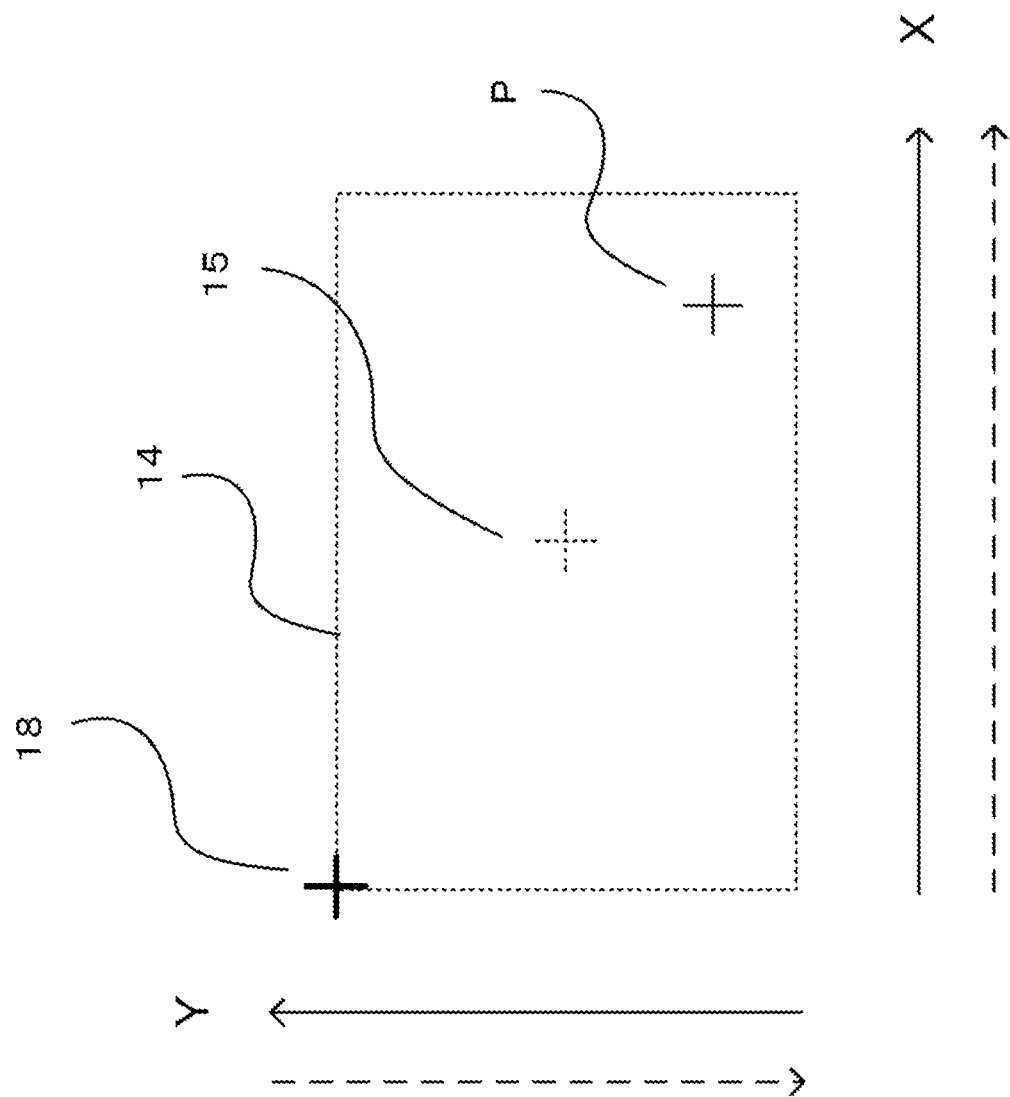
FIG. 4 is a diagram showing a relationship between an image manipulation system and a visual field coordinate system according to the embodiment.

Next, a description will be given of how to transform the detected coordinates in the visual field from an image manipulation system to the visual field coordinate system with reference to FIG. 4. How to calculate coordinates in the visual field will be described. Herein, FIG. 4 shows one visual field 14 shown in FIG. 2(B). A solid arrow indicates the visual field coordinate system, and a dashed arrow indicates an image manipulation coordinate system. A point 18 is an image manipulation system origin, and an upper left corner of the visual field is set as (0,0).

Herein, x (pixel) denotes an X coordinate in the image manipulation system, and y (pixel) denotes a Y coordinate in the image manipulation system. Then, x' (µm) denotes an X coordinate in the machine coordinate system and y' (µm) denotes a Y coordinate in the machine coordinate system. Further, width (pixel) denotes a width of a visual field image, height (pixel) denotes a height of the visual field image, and a denotes resolution of the camera 2 (for example, 6 µm or 10 µm).

Then, transformation to the visual field coordinate system is made by the following Equation (2): note that Equation (2) is applicable to coordinate transformation only within the visual field, and a distance from the machine coordinate system origin is calculated by both Equation (2) and Equation (1), $$x'=(x-\text{width}/2)*\alpha$$

$$y'=\{(\text{height}-y)-\text{height}/2\}*\alpha.$$

Figure 5:
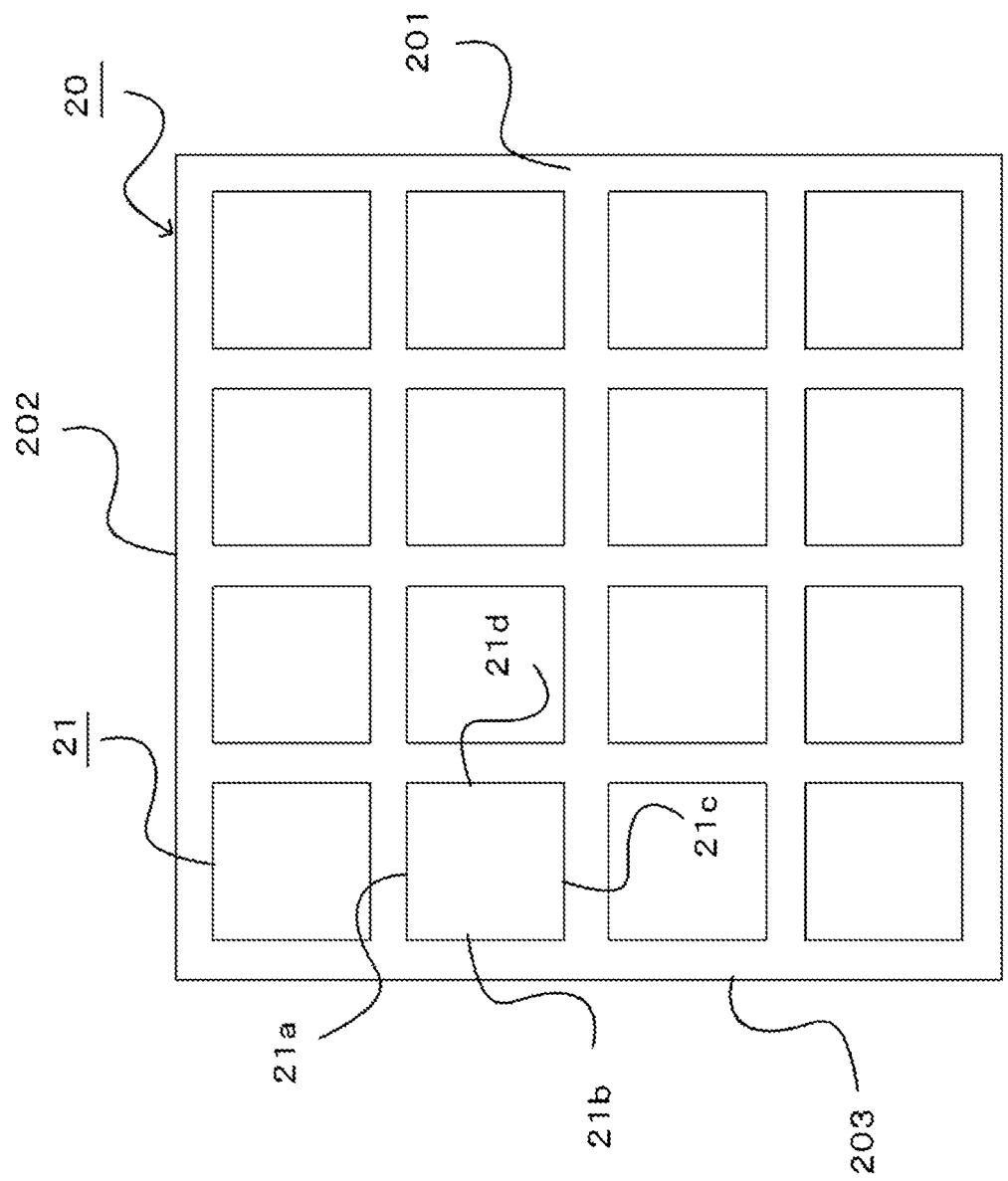
FIG. 5 is a plan view of a calibration plate according to the embodiment, showing a structure of the calibration plate.

FIG. 5 is a plan view of a calibration plate 20 for use in calibrating the visual inspection apparatus 1. The calibration plate 20 is a rectangular plate member that has a length of 510 mm and a width of 460 mm and is made of a material small in coefficient of thermal expansion, such as SUS304. On a surface 201 of the calibration plate 20 (a surface facing the camera 2), a plurality of square recessed portions 21 having sides 21a, 21b, 21c, 21d parallel to end sides 202, 203 of the calibration plate 20 are provided (in FIG. 5, the number of recessed portions 21 is 16). Each recessed portion 21 can be formed, for example, by spotfacing, thereby forming a steep edge at each of the sides 21a, 21b, 21c, 21d of the recessed portion 21 on a front surface of the calibration plate 20. Note that grid-patterned grooves parallel to the end sides of the calibration plate 20 may be formed on the front surface of the calibration plate 20 to provide a plurality of rectangular projecting portions. This also forms a steep edge at each side of the projecting portion on the front surface of the calibration plate 20.

Note that as the material of the calibration plate 20, not only metal such as SUS but also ceramics obtained by molding and sintering ceramic powder may be used. The steep edge at each of the sides 21a, 21b, 21c, 21d of the recessed portion 21 on the front surface of the calibration plate 20 can be formed with high accuracy by cutting a ceramic plate member using a diamond sintered tool or the like. The calibration plate 20 made of ceramic is higher in rigidity, chemical stability, wear resistance and less in deformation due to thermal expansion than SUS. Such a calibration plate 20 suffers neither rust nor deformation due to, for example, scratches or dents, thereby allowing calibration 20 to be made with high accuracy.

Further, when a synthetic resin such as plastic is used as the material of the calibration plate 20, machining accuracy up to about 10 µm can be achieved, thereby allowing the calibration plate 20 that is inexpensive and resistant to damage to be formed.

Figure 6:
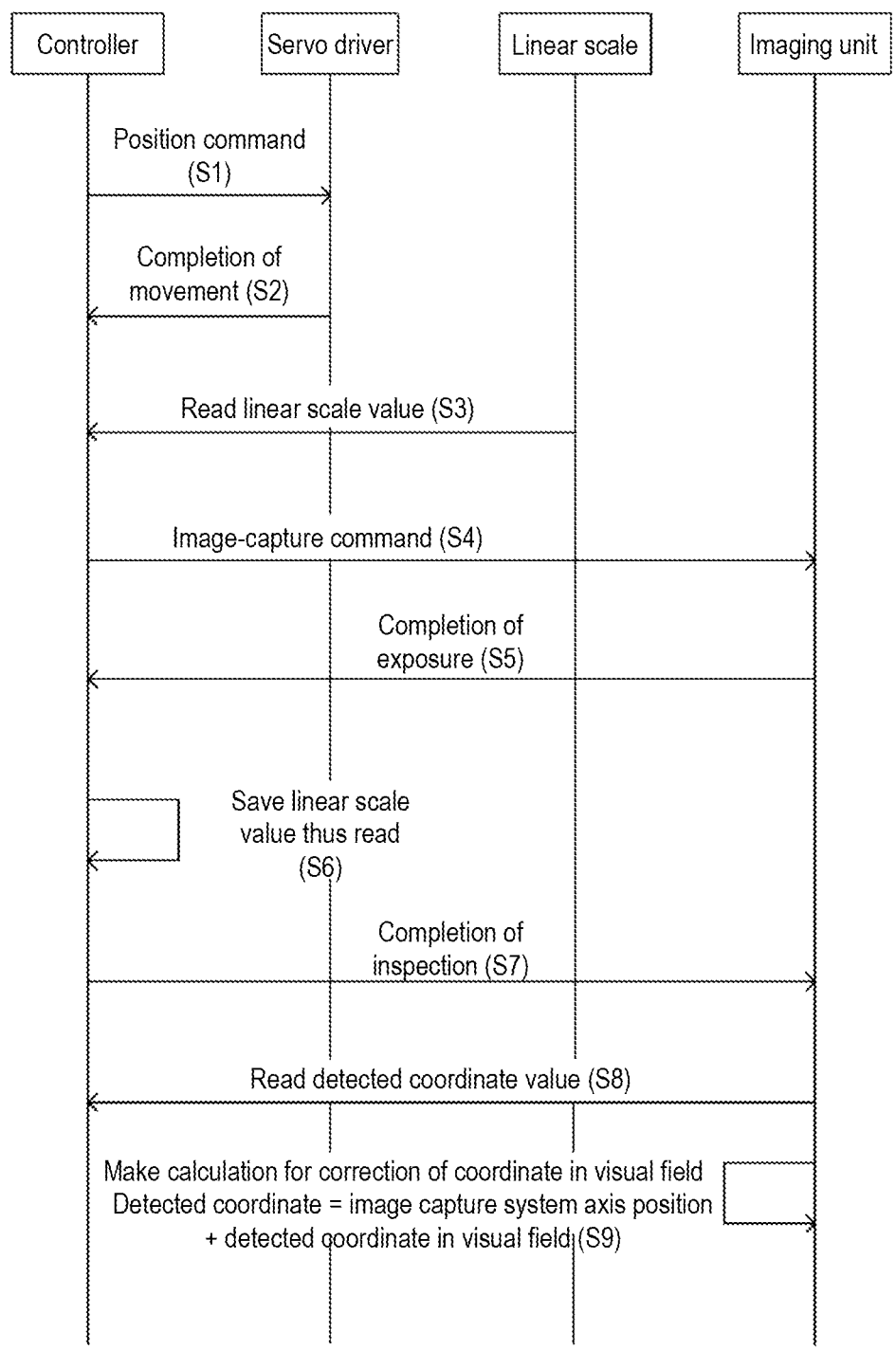
FIG. 6 is a time chart showing a flow of inspection made by the visual inspection apparatus according to the embodiment.

Next, a description will be given of the flow of inspection made by the visual inspection apparatus 1 with reference to the time chart shown in FIG. 6.

First, a controller sends a position command to a servo driver (step S1). The servo driver drives, upon receipt of the position command, a servo motor to move the gantry 4 and the imaging unit 3, and the servo driver sends, upon completion of movement to a predetermined position, a message indicating the completion of movement to the controller (step S2).

Then, the controller reads linear scale values corresponding to the predetermined position from the linear scales 8, 9 10 (step S3).

Next, the controller sends an image-capture command to the imaging unit 3 (step S4). The imaging unit 3 sends, upon completion of image capture, a message indicating completion of exposure to the controller (step S5).

Step S1 to step S5 are repeated until image capture for the entire visual field is completed.

The controller saves the values read from the linear scales 8, 9, 10 to a predetermined area in a storage unit (step S6). This point is the end of the inspection (step S7).

Next, the controller reads a detected coordinate value from an image processor of the imaging unit 3 (step S8). At this time, the image processor of the imaging unit 3 makes a calculation for correction of coordinates in the visual field such that detected coordinates=the image capture system axis position+the detected coordinates in the visual field (step S9).

Figure 7:
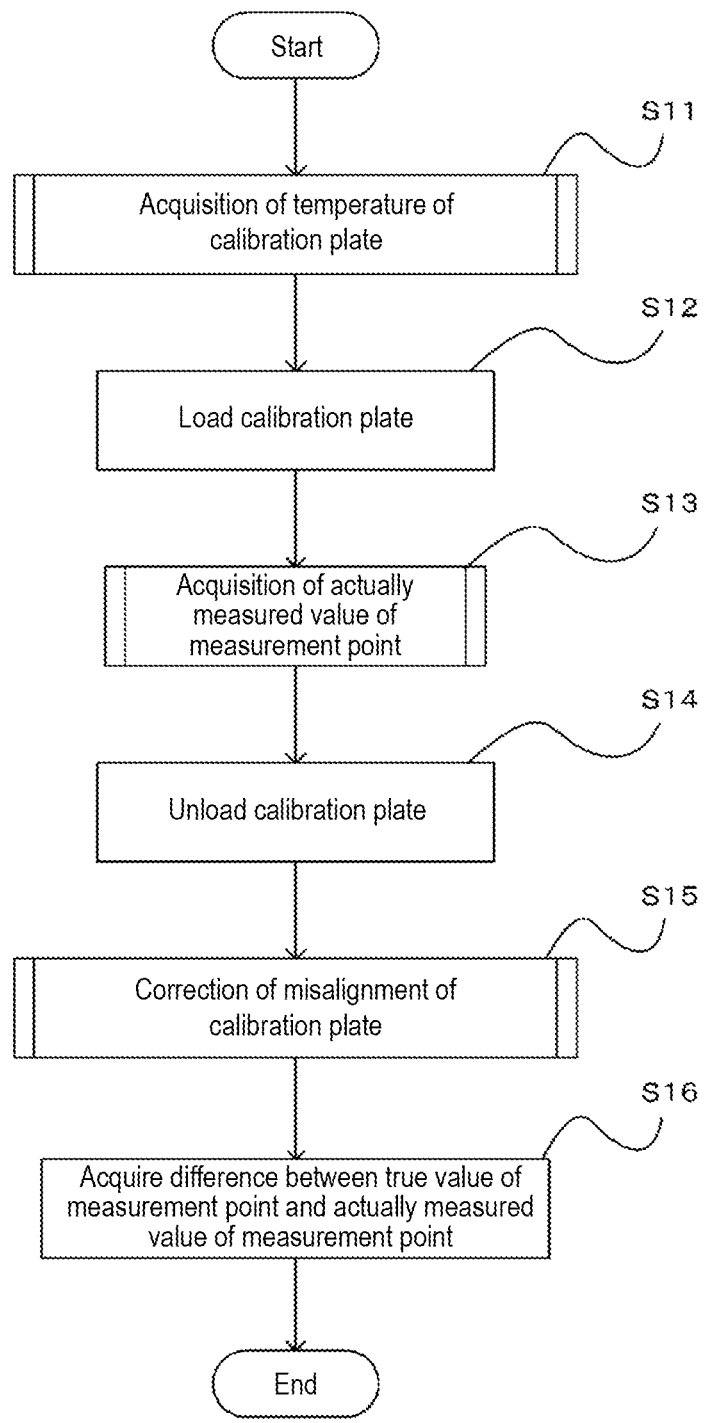
FIG. 7 is a flowchart showing an outline of a calibration flow according to the embodiment.

Next, a description will be given of the flow of calibration using the above-described calibration plate 20. FIG. 7 shows an outline of the flow of calibration. This process is performed, for example, when an operator inputs an instruction from a control panel of the visual inspection apparatus 1 to select a calibration mode at the time of assembly adjustment or regularly-scheduled inspection.

Figure 8:
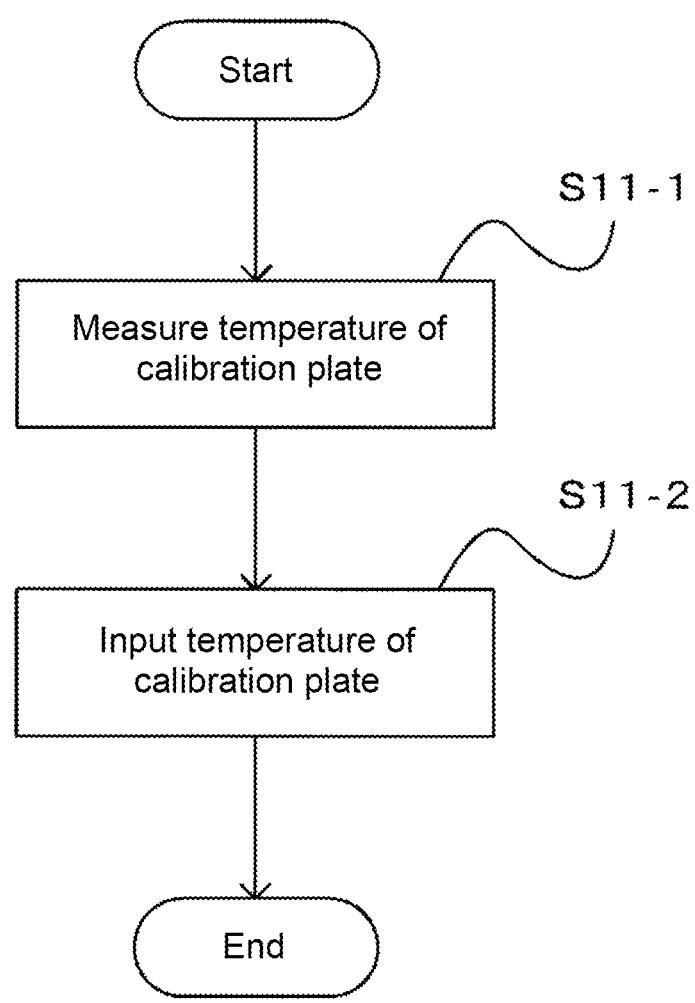
FIG. 8 is a flowchart showing a flow of acquisition of temperature of the calibration plate according to the embodiment.

First, a temperature of the calibration plate 20 is acquired for a process of correcting thermal expansion caused by a change in temperature of the calibration plate 20 (step 311). Details of a subroutine of this process will be described with reference to FIG. 8. First, the temperature of the calibration plate 20 is measured by a temperature measuring unit such as a non-contact thermometer (step S11-1). The temperature of the calibration plate thus measured is input from the control panel and stored in a predetermined storage area (step S11-2). The temperature data thus acquired is used to correct thermal expansion caused by a change in temperature.

Herein, a distance that changes due to thermal expansion is calculated by the following Equation (3):

Thermal expansion change distance (µm)=coefficient of thermal expansion*temperature difference (degree) from temperature when true value is measured*distance from the end origin of the calibration plate 20 (mm)/1000.

For example, it is assumed that the temperature of the calibration plate 20 during this calibration is 22.0 degrees, and the temperature of the calibration plate 20 during measurement of the true value is 24.0 degrees. When the calibration plate 20 is made of SUS304, the coefficient of thermal expansion is 17.3. Assuming that the distance from the end origin of the calibration plate 20 is 450 mm, the value of the thermal expansion change distance as the amount of change caused by thermal expansion is as follows:

$$17.3*(-2)*450/1000=-15.57 \text{ µm}.$$

Note that it is desirable that the temperature change during calibration be within ±0.1 degrees.

Next, the calibration plate 20 is loaded by the conveyor into the visual inspection apparatus 1, that is, to below the camera 2 (step S12).

Figure 9:
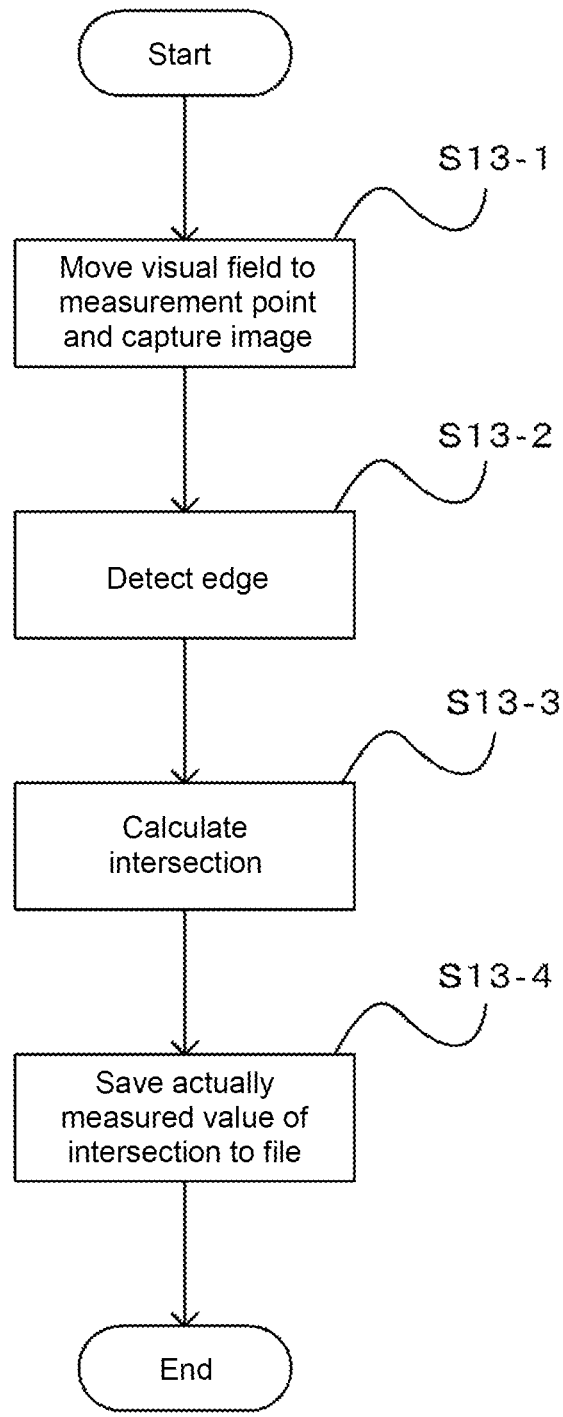
FIG. 9 is a flowchart showing a flow of a process of acquiring an actually measured value of a measurement point according to the embodiment.

Next, a process of acquiring an actually measured value of a measurement point is performed (step S13). Details of a subroutine of the process of acquiring an actually measured value of a measurement point will be described with reference to FIG. 9.

Figure 10A:
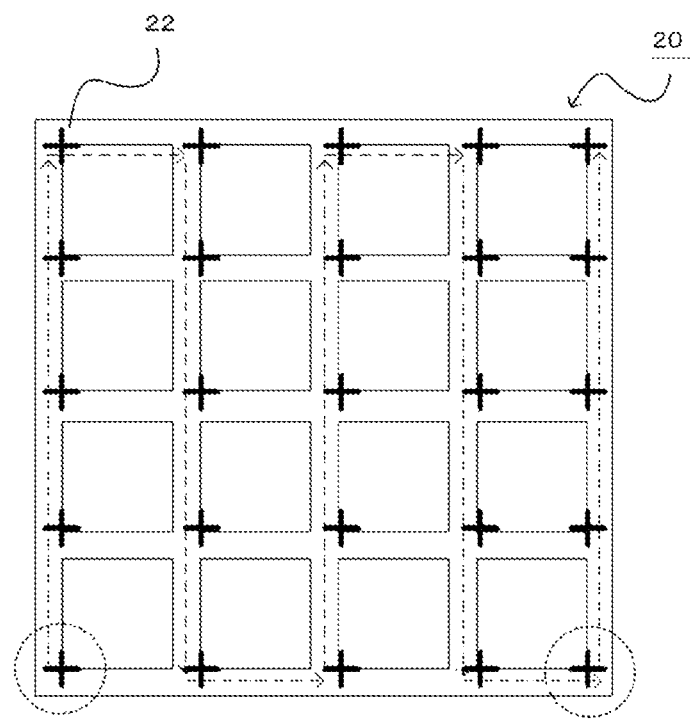
FIGS. 10(A) and 10(B) are diagrams for describing the process of acquiring an actually measured value of a measurement point according to the embodiment.
Figure 10B:
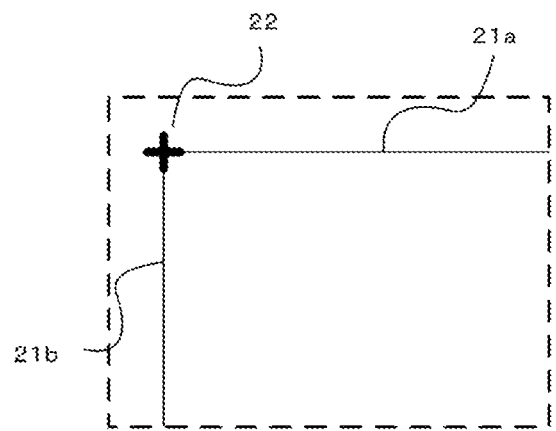
Figure 11:
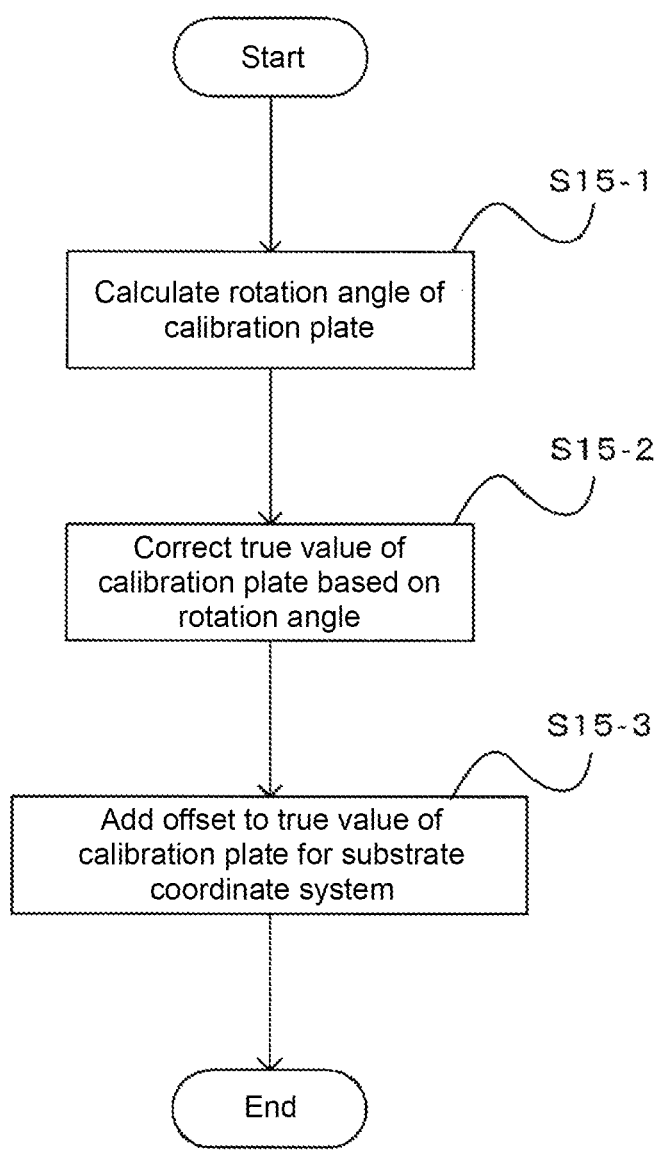
FIG. 11 is a flowchart showing a flow of correction of misalignment of the calibration plate according to the embodiment.

Along a dashed arrow in FIG. 10(A), the imaging unit 3 is moved to cause a point 22 (reference point) marked with a plus sign to come into the visual field (step S13-1). In FIG. 10(A), only the upper-left point marked with the plus sign is assigned a reference numeral, but the same reference numeral is assigned to the other points marked with the plus sign. An example of the visual field image of the camera 2 at this time is shown in FIG. 10(B). As shown in FIG. 10(B), the camera 2 is moved to cause the sides 21a, 21b of the recessed portion 21 intersecting each other to come into the visual field. Then, edges are detected from a captured image (step S13-2). Next, an intersection (measurement point) 22 of the edges thus detected is calculated by using the linear scales 8, 9, 10 as in the visual inspection (step S13-3), and a coordinate value of the intersection is saved to a file (step S13-4). Herein, the measurement point 22 corresponds to a reference point defined as the intersection of edges.

Returning to FIG. 7, subsequently, the calibration plate 20 is unloaded from the visual inspection apparatus 1 by the conveyor (step S14).

Next, misalignment of the calibration plate 20 is corrected (step S15). Details of a subroutine of the process of correcting misalignment of the calibration plate 20 will be described with reference to FIG. 12.

First, using measurement points located at the lower left and lower right of the calibration plate 20 (shown by dotted circles in FIG. 10(A)), a rotation angle θ of a calibration point is calculated by the following Equation (4) (step S15-1):

θ (rad)=arctan{(Y coordinate value of lower right measurement point–Y coordinate value of lower left measurement point)/(X coordinate value of lower right measurement point–X coordinate value of lower right measurement point)}.

First, the true value (X, Y coordinates) of the calibration plate 20 that takes into account a change in temperature between true value measurement and calibration using Equation (3) is corrected by the following Equation (5) (step S15-2):

X'=X cos θ−Y sin θ

Y'=X sin θ+Y cos θ.

Next, an offset is added, based on the coordinate values (X', Y') of the lower left measurement point of the calibration plate 20 obtained by Equation (5), to the true value for the substrate coordinate system in accordance with the following Equation (6) (step S15-3):

X''=X'+lower left measurement point of calibration plate (X)

Y''=Y'+lower left measurement point of calibration plate (Y).

Returning to FIG. 7, next, a difference between the X", Y" (the true value of the calibration plate 20) obtained by Equation (6) and the value saved to the file is taken and saved (step S16).

FIG. 12 shows an example of a user interface on which the difference between the true value of the measurement point of the calibration plate 20 corrected for rotation or misalignment and the actually measured value saved in step S13-4 is displayed as an error. In FIG. 12, the error thus obtained is displayed as an error table. Such an error display allows a confirmation of stopping accuracy of the visual inspection apparatus 1. Further, when the X axis or Y axis is prevented from operating normally due to a problem, or the imaging unit is not assembled properly, the error will be larger, so that the error display can be used as an index for calibrating each component of such mechanisms.

A description will be given of a specific example of the process of correcting detected coordinates of a measurement target point in step S9 during the visual inspection shown in FIG. 6 after the calibration using the calibration plate 20 shown in FIG. 7.

Figure 13:
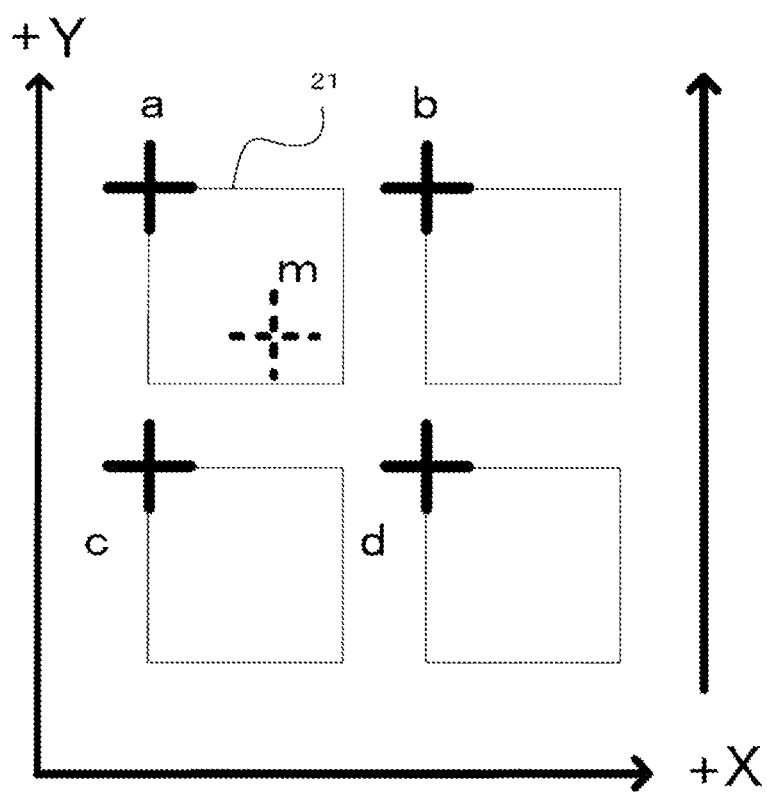
FIG. 13 is a diagram for describing correction of a coordinate value of a measurement target point according to the embodiment.

With reference to FIG. 13, Equation (7) of calculating a correction value for an XY coordinate values of a measurement target point m (indicated by a dashed plus sign) during visual inspection is shown below: where correction values for images captured at measurement points a, b, c, d during calibration are denoted by C(a), C(b), C(c), C(d), respectively, a correction value for an image captured at the measurement target point m is denoted by C(m), and _X and _Y denote an X coordinate value and a Y coordinate value, respectively, the XY coordinates of the measurement points a to c are normalized with c taken as (0,0), and note that there are two or only two measurement points around the measurement target point, the same calculation is made for two or one point, C(m)_X=(1−m_X)(0+m_Y)C(a)_X+

(0+m_X)(0+m_Y)C(b)_X+

(1−m_X)(1−m_Y)C(c)_X+

(0+m_X)(1−m_Y)C(d)_X

C(m)_Y=(1−m_X)(0+m_Y)C(a)_Y+

(0+m_X)(0+m_Y)C(b)_Y+

(1−m_X)(1−m_Y)C(c)_Y+

(0+m_X)(1−m_Y)C(d)_Y.

As described above, even when the linear scale 8, 9, or 10 becomes relatively inclined or misaligned, the visual inspection apparatus 1 can more accurately correct a value, detected by the linear scales, of a measurement target point on a measurement target object. Since the measurement point is the intersection of the edges detected from the image of the sides 21a to 21c of the recessed portion 21, and the sides of the recessed portion can have an appropriate length, an effect of an error during intersection calculation can be reduced, and the position coordinates of the measurement target point can be corrected more accurately.

Note that, in order to allow a comparison between the configuration requirement of the present invention and the configuration of the embodiment, the configuration requirement of the present invention will be described with the reference numerals used in the drawings.

<First Invention>

A method for correcting values detected by linear scales (8, 9, 10) of an apparatus (1), the apparatus (1) being configured to identify position coordinates of a point on an object to be imaged based on the values detected by the linear scales (8, 9, 10), the method including using a calibration plate (20) having recessed portions (21) or projecting portions arranged two-dimensionally, the recessed portions (21) or the projecting portions each having sides (21a, 21b, 21c, 21d) intersecting each other, holding, as a true value, position coordinates of an intersection of the sides in a substrate coordinate system defined for the calibration plate (20), acquiring, as an actually measured value, position coordinates, in the substrate coordinate system, of a reference point (22) defined as an intersection of edges detected from an image of the sides (21*a*, 21*b*, 21*c*, 21*d*), intersecting each other, of the recessed portions (21) or the projecting portions within a captured image of the calibration plate (20), the position coordinates being detected by the linear scales (8, 9, 10), and correcting values of the point, detected by the linear scales (8, 9, 10), on the object to be imaged using a difference between the actually measured value and the true value as a correction amount.

DESCRIPTION OF SYMBOLS

1: visual inspection apparatus
2: camera
8, 9, 10: linear scale
12: substrate coordinate system origin
P: point on substrate
20: calibration plate
21: recessed portion
21*a*, 21*b*, 21*c*, 21*d*: side
22: measurement point

The invention claimed is:

1. A method for correcting values detected by linear scales of an apparatus, the apparatus being configured to identify position coordinates of a point on an object to be imaged based on the values detected by the linear scales, the method comprising:

using a calibration plate having recessed portions or projecting portions arranged two-dimensionally, the recessed portions or the projecting portions each having sides intersecting each other;

holding, as a true value, position coordinates of an intersection of the sides in a substrate coordinate system defined for the calibration plate;

acquiring, as an actually measured value, position coordinates, in the substrate coordinate system, of a reference point defined as an intersection of edges detected from an image of the sides, intersecting each other, of the recessed portions or the projecting portions within a captured image of the calibration plate, the position coordinates being detected by the linear scales; and correcting values of the point, detected by the linear scales, on the object to be imaged using a difference between the actually measured value and the true value as a correction amount.

2. The method for correcting values detected by linear scales according to claim 1, wherein when there is a difference in temperature of the calibration plate between when the true value is acquired and when the actually measured value is acquired, the true value is corrected by an amount of change caused by thermal expansion based on the difference in temperature.

3. The method for correcting values detected by linear scales according to claim 1, wherein when there is misalignment of the apparatus between when the true value is acquired and when the actually measured value is acquired, the true value is corrected by an amount of the misalignment.

4. The method for correcting values detected by linear scales according to claim 1, wherein the calibration plate is made of a square plate and has the recessed portions arranged two-dimensionally, each of the recessed portions being formed by spotfacing into a square shape on a surface of the square plate and having the sides.

* * * * *